US012259866B2

United States Patent
Achkir et al.

(10) Patent No.: US 12,259,866 B2
(45) Date of Patent: Mar. 25, 2025

(54) DATA OPERATIONS ACCELERATION

(71) Applicant: Cisco Technology, Inc., San Jose, CA (US)

(72) Inventors: D. Brice Achkir, Livermore, CA (US); Kaushal Sanjay Mhalgi, San Jose, CA (US); Gautam Khandelwal, Tracy, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 18/162,160

(22) Filed: Jan. 31, 2023

(65) Prior Publication Data

US 2024/0256512 A1 Aug. 1, 2024

(51) Int. Cl.
*G06F 16/22* (2019.01)
*G06F 16/28* (2019.01)

(52) U.S. Cl.
CPC ........ *G06F 16/2272* (2019.01); *G06F 16/284* (2019.01)

(58) Field of Classification Search
CPC ............................ G06F 16/2272; G06F 16/284
USPC ............................................................ 707/741
See application file for complete search history.

(56) References Cited

U.S. PATENT DOCUMENTS

| 10,114,969 | B1* | 10/2018 | Chaney | ................. | G06F 21/64 |
| 10,225,076 | B2 | 3/2019 | Leng et al. | | |
| 10,664,305 | B1 | 5/2020 | Qiu | | |
| 11,356,424 | B2 | 6/2022 | Agarwal et al. | | |
| 11,368,289 | B1* | 6/2022 | Kvochko | ............... | G06V 20/46 |
| 2002/0059566 | A1* | 5/2002 | Delcambre | ........... | G06F 40/151 |
| | | | | | 717/146 |
| 2003/0061084 | A1* | 3/2003 | Menninger | .......... | G06Q 10/087 |
| | | | | | 705/28 |
| 2014/0013112 | A1* | 1/2014 | Cidon | ................... | G06F 16/182 |
| | | | | | 713/165 |
| 2018/0211202 | A1 | 7/2018 | Ynion, Jr. | | |
| 2019/0188706 | A1 | 6/2019 | McCurtis | | |
| 2020/0111092 | A1* | 4/2020 | Wood | ..................... | G06Q 40/04 |
| 2020/0177373 | A1 | 6/2020 | Komandur et al. | | |

(Continued)

FOREIGN PATENT DOCUMENTS

CN 108335207 B 8/2020
CN 109791594 B 10/2020

*Primary Examiner* — Kuen S Lu
(74) *Attorney, Agent, or Firm* — Edell, Shapiro & Finnan, LLC

(57) ABSTRACT

Methods that provide accelerated data operations by splitting data records into sub-records and by using in-memory storage. In these methods, a computing device obtains a complex data record that includes at least one unique identifier, primary information about the complex data record, and a plurality of data values that change over time. The computing device generates a plurality of data sub-records by splitting, based on a set of rules, the complex data record into a plurality of parts in which at least a portion of the primary information is separated from the plurality of data values and added to a respective data sub-record of the plurality of data sub-records, generating a unique binding identifier, and adding the unique binding identifier to each of the plurality of data sub-records to link the plurality of data sub-records to each other. The data sub-records are stored, using an in-memory database, into a blockchain.

20 Claims, 6 Drawing Sheets

(56) References Cited

U.S. PATENT DOCUMENTS

| | | | |
|---|---|---|---|
| 2020/0250747 A1* | 8/2020 | Padmanabhan | G06Q 20/065 |
| 2020/0389291 A1 | 12/2020 | Xiao | |
| 2022/0255907 A1 | 8/2022 | Agarwal et al. | |
| 2022/0389291 A1 | 12/2022 | Huang et al. | |
| 2023/0138192 A1* | 5/2023 | Wang | G16H 40/63 |
| | | | 705/2 |
| 2023/0237349 A1* | 7/2023 | Donoho | G06N 5/022 |
| | | | 706/46 |

* cited by examiner

DATA OPERATIONS ACCELERATION

TECHNICAL FIELD

The present disclosure generally relates to data networks and storage systems.

BACKGROUND

Number and size of data records in data networks and storage systems are growing exponentially. Database management systems are responsible for generating, managing and storing these data records. Typically, data records are stored in databases and are retrieved using data queries such as structured query language (SQL) queries. The queries may create, read, update, and delete data records in the database. The operations of creating, reading, updating, and deleting data in a storage system are typically referred to as CRUD operations. Since the number and size, and in some cases, complexity, of the data records increased, it is challenging to retrieve the needed data. For example, some CRUD operations may take an unacceptably long time. Other CRUD operations may simply fail or timeout e.g., big record size and/or too many data records are being requested.

DETAILED DESCRIPTION

Overview

Figure 1:
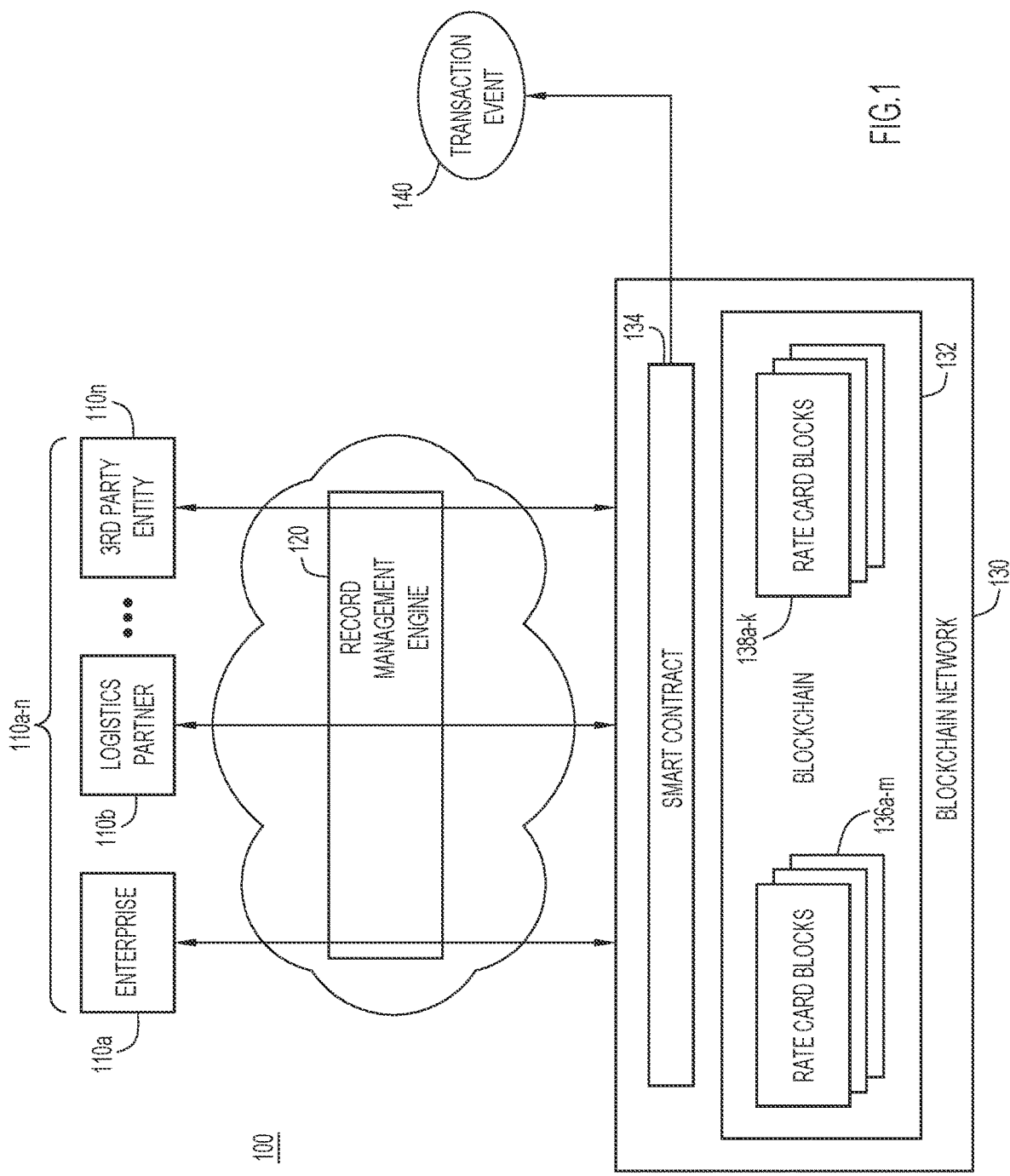
FIG. 1 is a block diagram illustrating a data network environment which includes a record management engine for managing data records in a blockchain storage system, according to an example embodiment.

Techniques are presented herein that provide accelerated data operations by splitting data records into sub-records and by using in-memory storage.

In one form, a computing device obtains a complex data record that includes at least one unique identifier, primary information about the complex data record, and a plurality of data values that change over time. The computing device generates a plurality of data sub-records by splitting, based on a set of rules, the complex data record into a plurality of parts in which at least a portion of the primary information is separated from the plurality of data values and added to a respective data sub-record of the plurality of data sub-records, by generating a unique binding identifier, and by adding the unique binding identifier to each of the plurality of data sub-records to link the plurality of data sub-records to each other. The computing device stores, using an in-memory database, the plurality of data sub-records into a blockchain.

Example Embodiments

Data management systems such as freight management systems, are designed to save and maintain rate books with multiple logistic partner enterprises or entities. Each logistic partner may have many records that are stored on a management system blockchain. The record size of an individual record may be around 5 kilobytes (KBs). File system is used to store the records on the backend while queueing up the records for operation. Existing data management systems are plagued with slow operation speed and operation failures when many records or large size records need to be fetched.

Because of quantity of records and record size, the speed of create, read, update, and delete (CRUD) operations is slow. In other words, with a file system as a backend queueing method, the time required to perform CRUD operations on the records is significant. Also, since only serial execution of operations is possible, the retrieval/fetching speed is slow. Moreover, if a ledger is overwritten more than once in a single transaction, there is a possibility of error.

Additionally, failures for query operations while fetching a huge number of records is not uncommon. The size of records causes timeout errors while fetching records for a particular logistic partner. As the size increases, a greater number of blocks are fetched at once. If the response is not received to a peer container from a smart contract container within a predetermined time, a timeout error occurs. Smart contracts are executable digital code or transaction protocols that automatically execute and control document events based on the terms in the contract. Smart contracts facilitate executing an agreement or a contract in a digital world. Document events are typically transactions that are recorded in a blockchain network.

As one example, a third-party framework called "Convector" is used to setup a Hyperledger network and construct the smart contract. The Convector allows model-controller pattern in the smart contract. However, using the Convector has the following drawbacks: Hyperledger version restrictions, peer limit, and lack of smart contract flexibility. Specifically, the Convector does not support the recent Hyperledger version that has more security features and application features. The Convector only allows one peer per enterprise and lacks flexibility in handling data from blockchain.

The techniques presented herein provide for accelerated data operations by splitting data records and/or transaction records into a plurality of sub-records and by using an in-memory storage to expedite the speed of retrieval operations. The techniques presented herein improve performance of data management systems such as a freight management system and avoid failure operations while fetching multiple data records. Specifically, complex data records are split into multiple sub-records such that only the needed portions of the complex data record are retrieved. Further, multiple write operations may be performed to a ledger in a single transaction. The techniques flexibly handle data to and from a blockchain ledger. In-memory storage allows for parallel processing and job executions.

While one or more example embodiments presented below describe a freight management system, this is just one example. The techniques apply to various data management networks and systems depending on a particular deployment and use case scenario. The techniques are not limited to transactional data records and/or smart contracts. The techniques apply to data records stored in a blockchain and on which CRUD operations are performed.

FIG. 1 is a block diagram illustrating a data network environment 100 which includes a record management engine for managing data records in a blockchain storage system, according to an example embodiment. The data network environment 100 includes entities 110a-n that interact with a blockchain network 130 via a record management engine 120.

The notations "a-n", "a-m, "a-k," "a-j", "1-n", and the like, denote that a number is not limited, can vary widely, and depends on a particular use case scenario and deployment.

Entities 110a-n may include an enterprise 110a, a logistic partner 110b, a $3^{rd}$ party entity 110n such as vendors, auditors, telemetry collectors, etc. Entities 110a-n interact with the blockchain network 130 using one or more user devices. These user devices are any suitable device configured to initiate CRUD operations, such as data source device and/or data sink device. The user devices may be a computer, an enterprise device, an appliance, an Internet of Things (IoT) device, a Personal Digital Assistant (PDA), a laptop or electronic notebook, a smartphone, a tablet, and/or any other device and/or combination of devices, components, elements, and/or objects capable of initiating voice, audio, video, media, or data exchanges within the data network environment 100. A user device may also include any suitable interface to a human user such as a microphone, a display, a keyboard, or other terminal equipment. The use device may be configured with appropriate hardware (e.g., processor(s), memory element(s), antennas and/or antenna arrays, baseband processors (modems), and/or the like such as those depicted and described in further detail in FIG. 6), software, logic, and/or the like to facilitate respective Over-the-Air (OTA) interfaces for accessing/connecting to the blockchain network 130 via the record management engine 120 and sending or receiving packets.

The record management engine 120 includes a record splitting engine and an in-memory storage. The record management engine 120 may be deployed on one or more servers and may be configured with appropriate hardware (e.g., processor(s), memory element(s), antennas and/or antenna arrays, baseband processors (modems), and/or the like such as those depicted and described in further detail in FIG. 6), software, logic, and/or the like to facilitate respective Over-the-Air (OTA) interfaces for accessing/connecting to the blockchain network 130 and sending or receiving packets or data such as queries and/or data records to and from the entities 110a-n.

The record splitting engine splits or divides of a large complex data record into multiple small records, referred to as "data sub-records". For example, a transaction may be split into multiple parts or blocks. Each block contains a small transaction or a portion of the large complex data record. Hence, the records are fetched without failure. As another example, the record splitting engine splits a 5 KB data record into small records or data sub-records. Each data sub-record has an approximate size of 90 bytes. Splitting of the complex data record addresses an issue of a large packet payload when updating the complex data record and/or performing other CRUD operations. When the complex data record is updated, instead of updating an entire complex data record, updating involves only required field(s), thus improving the speed of the transaction. In other words, only relevant needed sub-records are fetched and not the entirety of the complex data record.

The in-memory storage includes one or more in-memory databases. In-memory databases are purpose-built databases that rely primarily on a memory for data storage, in contrast to databases that store data on a disk or solid-state drives (SSDs). In-memory databases are designed to enable minimal response time for storage access operations such as CRUD operations. In related art, since data is stored in a file system and accessed from the storage when required, the latency of CRUD operations is high. In an example embodiment, the latency is significantly reduced since the in-memory database is used. Further, in-memory databases allow for parallel operations on multiple transactions without a failure.

One non-limiting example of the in-memory database is REDIS. REDIS stores data in a key-value format and performs various data operations (e.g., CRUD operations) using jobs or tasks. A REDIS node integrates through a backend with one or more data applications executing on the user devices of the entities 110a-n using a backend-service and executes parallel jobs by communicating with the blockchain network 130 using a blockchain service.

The blockchain network 130 includes a blockchain 132 and a smart contract 134.

The blockchain 132 may include one or more permissioned ledgers that store various data such as data rate cards and/or transaction data for coordinating between the entities 110a-n e.g., auditing, tracking, billing, management, etc. The blockchain 132 may include one or more blockchain nodes which implement and maintain one or more blockchains. The blockchain nodes may include one or more servers and/or executable software application on a computing device such as the one in FIG. 6, a virtual machine, etc. When multiple ledgers are provided, same or different blockchain node may implement each ledger, depending on a particular deployment and use case scenario. Ledgers are blockchains or data objects that are stored in a datastore such as a remote, distributed, and/or local memory. The blockchain 132 may be a permissioned blockchain or a distributed blockchain such as a Hyperledger blockchain. The blockchain 132 stores one or more data sub-records in a form of data blocks.

For example, for a freight management system, the data sub-records include rate card blocks 136a-m and invoice blocks 138a-k.

The rate card blocks 136a-m include a rate record identification, primary information such as transport mode, service type, etc. and multiple data values such as approved and/or negotiated dates, weight values, price values, etc. A first rate card block set stores immutable information i.e., that does not change over time such as the rate record identification and the primary information. A second rate card block set stores mutable information that changes over time such as data values that are being negotiated and/or approved such as dates, prices, weight, etc. The data values may be numeric values or other attributes in a different format. These data values are subject to change over time e.g., being negotiated.

The invoice blocks 138a-k include an invoice unique identifier and primary information such as shipment tracking number and data values that change over time such as charges incurred, shipment delivery date, etc. A first invoice block set stores the immutable information such as the primary information (identifiers, shipment date, etc.) and a second invoice block set stores mutable information such as data values (charges incurred, differences after a reconciliation process, etc.)

The smart contract 134 define a set of rules that govern interactions with the blockchain 132. The smart contract 134 may govern which of the entities 110a-n are authorized to access the blockchain 132 and type of permitted interactions i.e., access rules. For example, the smart contract 134 may define rules for sharing data in the blockchain 132, which data may be updated by which entity, etc. The smart contract 134 may authorize the enterprise 110a to access the rate card blocks 136a-m but not the logistic partner 110b nor the $3^{rd}$ party entity 110n. Similarly, the smart contract 134 may permit the logistic partner 110b to access the invoice blocks 138a-k but not the $3^{rd}$ party entity 110n.

The smart contract 134 further includes validation rules for modifying data in the blockchain 132 and event rules for generating events. The smart contract 134 may permit only the enterprise 110a to update data valuers in the rate card blocks 136a-m and not the logistic partner 110b. Further, the smart contract 134 may generate a transaction event 140 that authorizes payment to the $3^{rd}$ party entity 110n (e.g., vendor).

The entities 110a-n interact with the blockchain network 130 using the record management engine 120 via one or more communication networks e.g., the Internet, public network, private network, etc. The entities 110a-n transmit queries, requests, data records, and/or other messages to the blockchain network 130.

This is only an example of the data network environment 100, and the number and types of entities may vary based on a particular deployment and use case scenario, such as the type of service being provided, entities present, and/or network structures.

Figure 2:
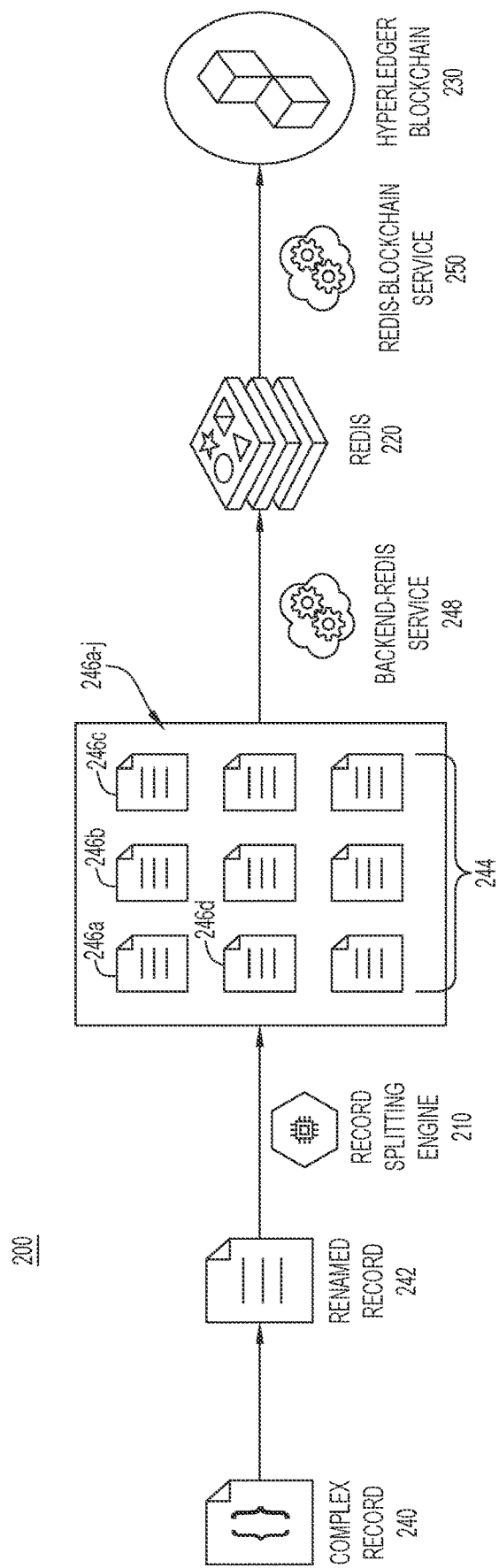
FIG. 2 is a sequence diagram illustrating a method of generating data sub-records for a blockchain based on a complex data record, according to an example embodiment.

With continued reference to FIG. 1, FIG. 2 is a sequence diagram illustrating a method 200 of generating data sub-records for a blockchain based on a complex data record, according to an example embodiment. The method 200 involves a record splitting engine 210 and a REDIS 220 such as the record management engine 120 of FIG. 1. The method 200 further involves a Hyperledger blockchain 230 such as the blockchain network 130 of FIG. 1.

The method 200 involves at 240, obtaining a complex record. The complex record may be provided by one of the entities 110a-n in FIG. 1 for storage in the Hyperledger blockchain 230. The complex record is provided to the record splitting engine 210. The complex record is in a complex object format.

For example, in a case of freight management system, the complex record may be a rate card, referred to as a "rate-record". The rate-record uses complex object data structure to store the data into the Hyperledger blockchain 230. At an atomic level, the data is stored in the key-value pair or key-value format. The data of the complex record is mainly classified into various fields such as a header field, an approved field, and a negotiated field.

The header field includes primary information about the rate-record. This primary information does not change over the time e.g., immutable. The header field contains basic information about the rate-record such as a rate-record identifier (ID) that uniquely identifies the complex record, lane ID that uniquely identifies the freight route, a transport mode such as air, water, land, etc., a service type such as expedited, regular, etc.

The approved field includes final approved values of sub-fields which are applied for various transactions such as billing and/or invoice reconciliations. The approved values are changed by negotiating between an enterprise and a partner, for example. The approved field includes most recently approved values of the rate-record such as expiration date, all cost rates, etc. The approved field includes data values that change over time (mutable) e.g., through negotiations.

The negotiated field includes data values that are being negotiated. That is, the negotiated field includes sub-fields with changed values as per the latest negotiation e.g., between the entities 110a-n. This field includes recently negotiated values over the approved values. While the subfields are similar to the subfields in the approved field, they may change more frequently over time. Further, these data values are not used in generating event transactions such as billing, etc. These data values are transient and change throughout the process of negotiations.

The complex record may include hundreds of fields. In an example embodiment, instead of storing the complex record in a form of a complex object, data from the complex record is extracted, converted, and is stored in a linear fashion in the Hyperledger blockchain 230. That is, when the complex record is stored as a single transaction into the blockchain, slow speed and/or timeout errors may occur when fetching or storing the complex records because the complex records are complex objects that have large size (e.g., in KBs). Further, updating a single record field in the complex record may take a long time due to unwanted extra payload of an entire transaction being retrieved for updated (e.g., an entirety of an invoice complex record is retrieved). In the method 200, however, the complex record is converted into a plain object, split into parts, and portions thereof are added to generated data sub-records based on a set of rules. Thus, processing delays and timeout errors may be avoided.

Specifically, at 242, the record splitting engine 210 (or another component in the record management engine 120 of FIG. 1) renames one or more fields (or field names) of the complex record. To avoid duplicate names, the record splitting engine 210 renames the fields (or field names) for the data sub-records. For example, if the field name is approved or negotiated, the field may be renamed to approved field 1, approved field 2, etc. The record splitting engine 210 may use a schema for renaming the one or more fields of the complex record.

Moreover, in one example embodiment, the record splitting engine 210 converts the complex record into a plain data object or record. For example, the complex record may be converted into the plain data structure in an extensible markup language (XML) format, or another standard text-based format such as JavaScript Object Notation (JSON). By converting the complex record into the plain data object, the data structure is in a linear format such as: rate record ID, transport mode, service type, approved_expiration_date, approved_DTD_Transport_date_0-40 Kg (DTD indicating a door-to-door service), negotiated_expiration_date, negotiated_DTD_Transport_date_0-40 Kg, etc.

After processing the complex record (renaming and converting operations), the method 200 involves at 244, generating a plurality of data sub-records. The plurality of data sub-records may be of an approximately same size.

Specifically, the record splitting engine 210, using a set of rules, smartly splits the plain record into multiple parts such that immutable primary information (e.g., data in the header field) is stored separately in one or more sub-records from the other information i.e., data values that change overtime such as values in the approved field and the negotiated field. The record splitting engine 210 further generates a common record identifier called a "unique binding identifier" and adds the unique binding identifier to each generated data sub-record. The unique binding identifier links the generated data sub-records to one another. All sub-records have a common unique binding identifier, which links them together upon fetching from the Hyperledger blockchain 230.

In one example embodiment, the record splitting engine 210 generates multiple sub-records 246a-j such that a first sub-record 246a includes at least a portion of the primary information such as a rate-card identifier and a transport mode for a freight management system. A second sub-record 246b includes another portion of the primary information such as service type, lane identifier, etc. The primary information is included in a first data sub-record set without any of the data values i.e., mutable information. That is, the first data sub-record set does not include any of the data values that change over time. A second data sub-record set has the data values that change over time. For example, a third sub-record 246c stores one or more time-related data values (e.g., expiration date for approved values, expiration date for negotiated values, etc.) and a fourth sub-record 246d stores one or more price-related data values (e.g., negotiated DTD date, weight, price, etc.).

By storing primary information in separate sub-records from the data values that change over time, data operations speed is increased. For example, at the time of updating a data value of a complex record (e.g., price-related data value), only one needed sub-record is retrieved as opposed to an entirety of the complex record. Since, at the time of update, only negotiated or approved field is updated, there is no need to update header field (primary information such as the transport mode) and the transaction payload is substantially reduced to only the values being updated such as price-related data value.

In one example, the record splitting engine 210 splits the plain data record into multiple parts e.g., around 10 parts of approximately same size. Each part is then added into a respective data sub-record of the data sub-records 246a-j. The data sub-records 246a-j may be of a fixed length (approximately the same size). Each of the sub-records 246a-j includes a unique binding identifier which binds or links the sub-records 246a-j to one another.

The method 200 then uses the REDIS 220 to store the sub-records into the Hyperledger blockchain 230 using an application programming interface (API). Specifically, at 248, a backend-Redis service integrates with the record splitting engine 210 and obtains the data sub-records 246a-j and provides them to the REDIS 220 (e.g., in-memory database node). The backend-Redis service processes the data and uploads it into the REDIS 220 (e.g., a server). REDIS 220 queues the tasks based on the first come, first served (FCFS) policy. REDIS improves the offline upload of the data sub-records in terms of speed with respect to other file systems.

At 250, using Redis-blockchain service, the REDIS 220 stores the data sub-records 246a-j into the Hyperledger blockchain 230. The REDIS 220 performs parallel job executions such that the backend-Redis service retrieves multiple data sub-records at once (parallel processing or multiple jobs) and the Redis-blockchain service stores multiple data sub-records into the Hyperledger blockchain 230 at once (executes multiple transactions or tasks with the Hyperledger blockchain 230 at substantially same time and not sequentially). The Redis-blockchain service uploads the data sub-records 246a-j from the REDIS 220 to Hyperledger blockchain 230 in a parallel execution. In one example embodiment, response feedback may be generated and send to a requesting entity i.e., the end-user via a user device, when the task execution is completed.

Figure 3:
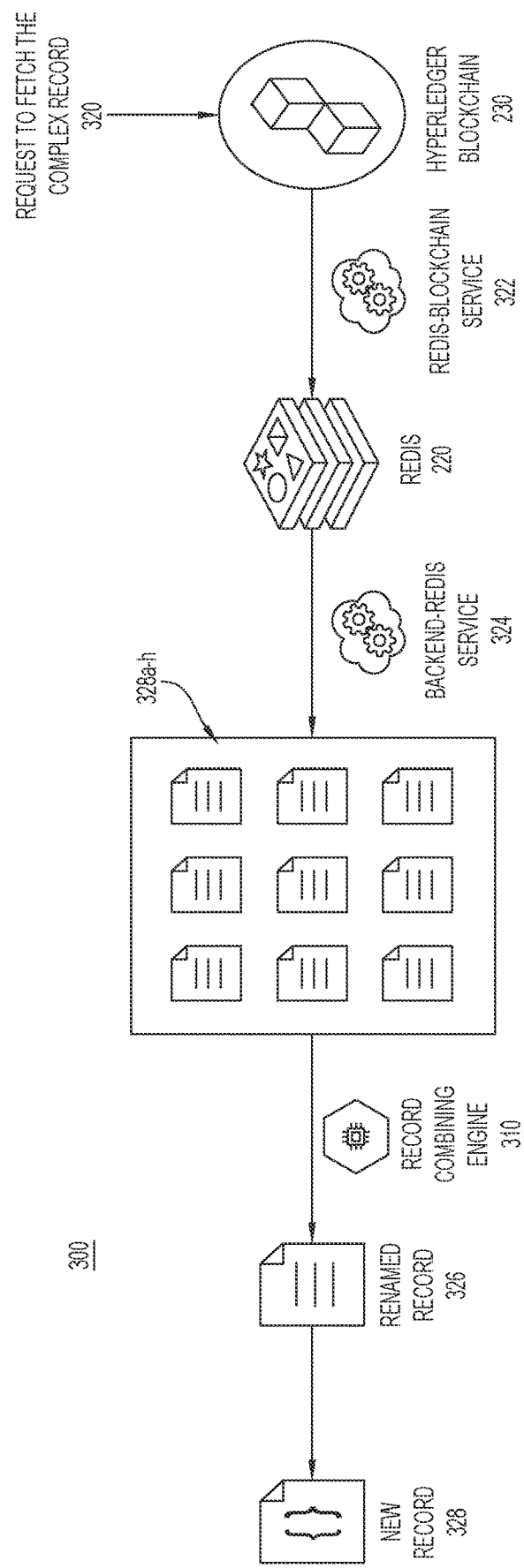
FIG. 3 is a sequence diagram illustrating a method of providing at least a portion of a complex data record based on a fetch request, according to an example embodiment.

With continued reference to FIGS. 1 and 2, FIG. 3 is a sequence diagram illustrating a method 300 of providing at least a portion of a complex data record based on a fetch request, according to an example embodiment. The method 300 involves a record combining engine 310 and the REDIS 220 of FIG. 2. The method 300 further involves the Hyperledger blockchain 230 of FIG. 2.

The record combining engine 310 is part of the record management engine 120 of FIG. 1. The record combining engine 310 combines one or more data sub-records to generate a new record that matches or models the original model of the complex data record. The requests for records are fetched using two APIs: a first API for fetching the entirety of the complex data record e.g., to copy, delete, read the entire complex data record and a second API for updating a portion thereof (one or more values such as price-related values). That is, based on obtaining the needed values in a selected sub-record, the user device may perform one or more actions e.g., generate a transaction using the smart contract 134 of FIG. 1, update a value, etc.

Specifically, the method 300 involves at 320, obtaining a request to fetch the complex data record. The request to fetch the complex data record may be provided by one of the entities 110a-n in FIG. 1 to the record management engine 120 of FIG. 1.

The record management engine 120 determines whether the request is to fetch an entirety of complex data record or an updating request where only a portion of the complex data record is required (only some data values such as price-related values). When the request is for the entirety of the complex data record, the record management engine 120 uses the REDIS 220 to fetch all of the data sub-records based on the unique binding identifier. On the other hand, when the request is an updating request, the record management engine 120 selects only some of the data sub-records 246a-j. For example, a set of sub-records having a given identifier is obtained (e.g., negotiated_1, negotiated_2, etc.). For this updating request, the data sub-records that store the primary information (immutable information) are not selected.

That is, at 322, the record management engine 120 uses Redis-blockchain service to retrieve one or more data sub-records (as determined and selected) and at 324, the selected data sub-records are provided by the backend-Redis service to the record combining engine 310.

At 326, the record combining engine 310 ties all the retrieved, selected data sub-records 328a-h into one new record. In other words, the record combining engine 310 generates a new record that includes the selected set of data sub-records 328a-h. This combining of the data sub-records 328a-h is performed using the unique binding identifier that is maintained across all the data sub-records generated from a complex data record as detailed in the method 200 of FIG. 2. The new record is constructed such that it includes at least a set of data sub-records 328a-h. For example, the set of data sub-records 328a-h only includes data sub-records with data values of the negotiated field or data values of the approved field. This type of new record omits and skips a set of data sub-records that store the primary information because the primary information does not need to be updated and typically remains unchanged (e.g., permanently assigned).

At 328, the record combining engine 310 renames the new record to match or to model the complex data record. Based on the new record, the entities 110a-n may perform one or more actions such as change a data value or generate a transaction e.g., request shipping, generate an invoice, pay a bill, reconcile an invoice, etc.

Figure 4:
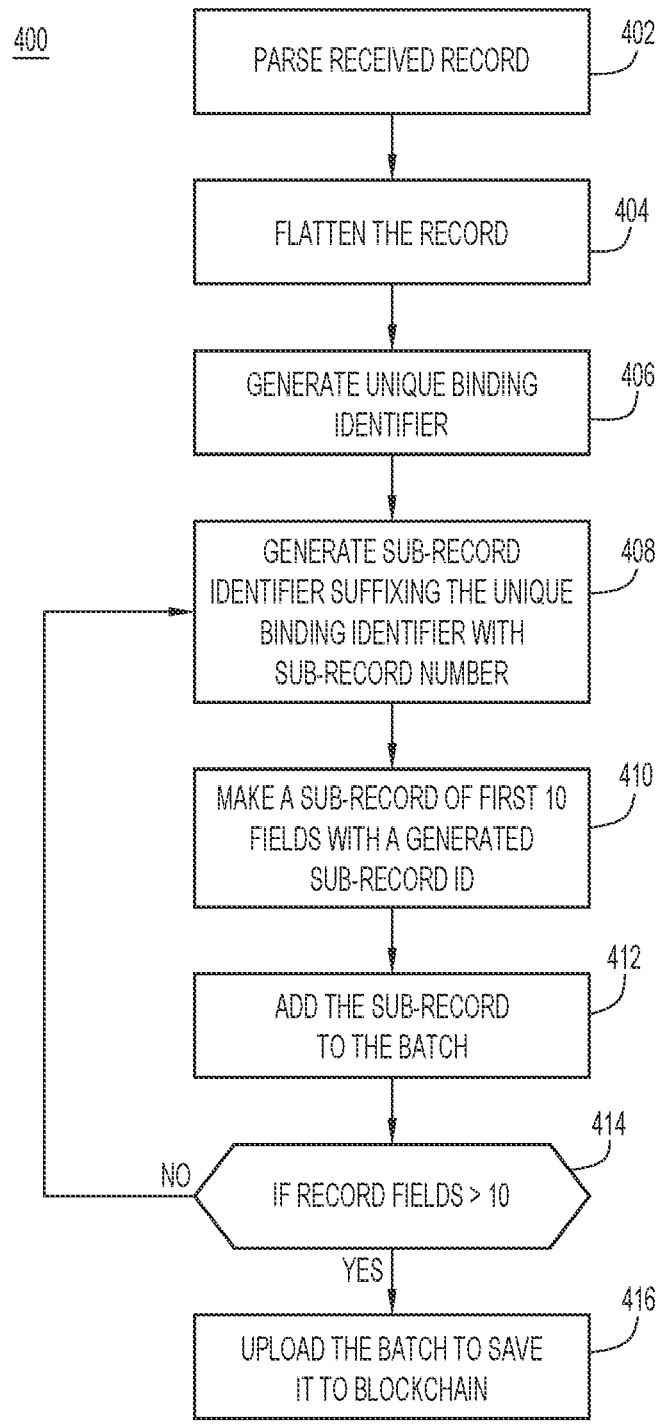
FIG. 4 is a flowchart illustrating a method of uploading a batch of data sub-records, generated from a complex data record, into a blockchain, according to an example embodiment.

With continued reference to FIGS. 1 and 2, FIG. 4 is a flowchart illustrating a method 400 of uploading a batch of data sub-records, generated from a complex data record, into a blockchain, according to an example embodiment. The method 400 may be performed by record management engine 120 of FIG. 1 and/or its components such as the record splitting engine 210 of FIG. 2 and the REDIS 220 of FIGS. 2 and 3.

The method 400 starts with the record management engine 120 obtaining a complex data record such as a rate-card in a complex object format. The rate-card may include a record identifier, primary information in a header field, data values in the negotiated and approved fields that change over time. Additionally, these fields may include various sub-fields that are specific to the record.

At 402, the record management engine 120 parses the complex data record to determine data therein e.g., type, size, data included, etc. The record management engine 120 may split, based on a set of rules, the complex data record into a plurality of parts in which at least a portion of the primary information is separated from the plurality of data values.

At 404, the record management engine 120 flattens the complex data record by converting the complex data record into a plain object that includes the primary information and the plurality of data values in a linear format, for example. Additionally, the plain data record is renamed with respect to a plurality of field names in the complex data record. The renamed record is a transformed record with respect to the complex record and has reduced complexity in comparison to the complex data record. The renamed record is the plain object with renamed field names. The size of the renamed record is also reduced with respect to the complex data record.

At 406, the record management engine 120 generates a unique binding identifier that links data sub-records to one another and at 408, the record management engine 120 generates a sub-record identifier for each data sub-record being generated by suffixing the unique binding identifier by a sub-record number. The size of the sub-records is approximately the same.

At 410, the record management engine 120 generates a sub-record that includes a first set of fields (e.g., ten fields or a predetermined number of subsequent fields depending on the complex data record determined at 402) and further includes the generated sub-record identifier. The generated sub-records are a set of small records of approximately same size. Each small record has a predetermined size of a certain number of bytes. In one or more example embodiments, each data sub-record includes only one of: (1) the primary information (immutable data) or (2) the data values that change over time. The data sub-records typically do not include both types of data. That is, the record management engine 120 splits the complex data record smartly by separating the immutable primary information from the mutable part of the complex data record (i.e., data values that change over time) to avoid unnecessary payload. By having the primary information in separate data sub-records, the entire complex record need not be retrieved for an update. That is, for some of the CRUD operations, it would be sufficient to only obtain one or more data values that are being changed and not the entire data record.

At 412, the generated sub-record is added to a batch and at 414, the record management engine 120 determines if a preset number of sub-records are generated. For example, if the complex data record is to be split into 10 sub-records of approximately same size, the record management engine 120 determines whether ten sub-records have been generated. Based on determining that the preset number of sub-records are not yet generated, the method 400 returns to 408 to generate the next data sub-record. On the other hand, if the preset number of sub-records (e.g., 10) is generated, the method proceeds to 416. At 416, the batch of data sub-records is uploaded to an in-memory storage that stores them in the blockchain network 130 in a key-value format, for example. The in-memory database uploads the batch to the blockchain network 130 in parallel execution.

The technique presented herein accelerate data operations such as CRUD operation and decrease latencies associated with data management in a blockchain based data networks by splitting complex data records into multiple sub-records in which immutable data is separate from mutable data and by using the in-memory database.

Figure 5:
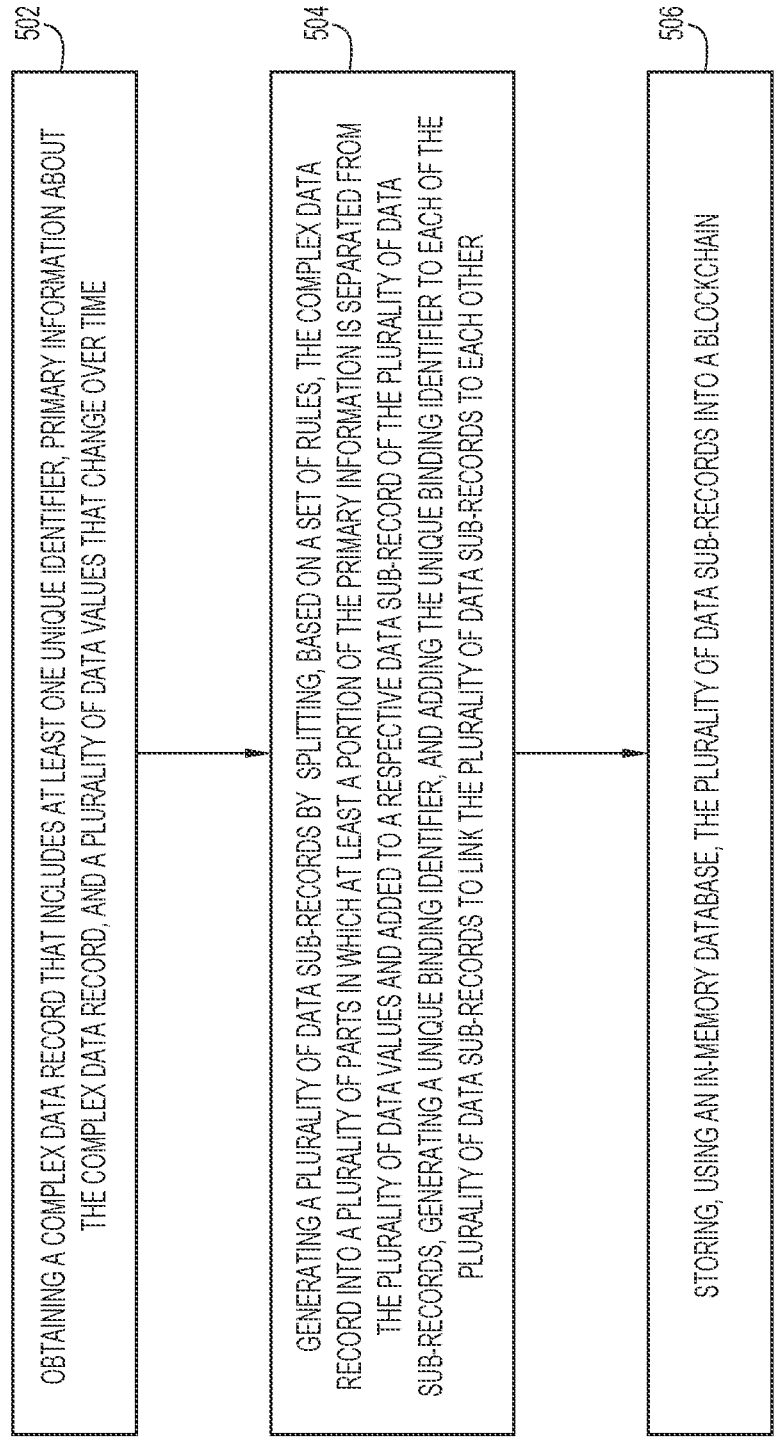
FIG. 5 is a flowchart illustrating a method of storing a complex data record as a plurality of data sub-records in a blockchain, according to an example embodiment.

FIG. 5 is a flowchart illustrating a method 500 of storing a complex data record as a plurality of data sub-records in a blockchain, according to an example embodiment. The method 500 may be performed by a record management engine 120 of FIG. 1 and may involve a record splitting engine 210 of FIG. 2, a record combining engine 310 of FIG. 3, and/or REDIS 220 of FIGS. 2 and 3.

The method 500 involves at 502, obtaining a complex data record that includes at least one unique identifier, primary information about the complex data record, and a plurality of data values that change over time.

The method 500 further involves at 504, generating a plurality of data sub-records. The plurality of data sub-records are generated by splitting, based on a set of rules, the complex data record into a plurality of parts in which at least a portion of the primary information is separated from the plurality of data values and added to a respective data sub-record of the plurality of data sub-records, by generating a unique binding identifier, and by adding the unique binding identifier to each of the plurality of data sub-records to link the plurality of data sub-records to each other.

The method 500 further involves at 506, storing, using an in-memory database, the plurality of data sub-records into a blockchain.

In one form, the operation 506 of storing the plurality of data sub-records into a blockchain may involve converting the plurality of data sub-records into a key-value format, where the plurality of data sub-records are approximately same size and uploading, using an application programming interface, in parallel, the plurality of data sub-records into the blockchain.

In one instance, the operation 504 of generating the plurality of data sub-records may involve converting the complex data record into a plain object that includes the primary information and the plurality of data values being renamed with respect to a plurality of field names in the complex data record.

In one or more example embodiments, splitting the complex data record of the operation 504 may involve obtaining, from the plain object, the primary information and the at least one unique identifier that does not change over time, generating at least one immutable field, and adding the primary information, obtained from the plain object, to the at least one immutable field.

In one or more example embodiments, splitting the complex data record of the operation 504 may further involve obtaining, from the plain object, the plurality of data values that include at least one negotiable data value and at least one approved data value, generating a plurality of mutable fields, and adding the plurality of data values into the plurality of mutable fields.

In another instance, the operation 504 of generating the plurality of data sub-records may further involve generating a first sub-record that includes the at least one immutable field and not any of the plurality of mutable fields and generating a second sub-record that includes at least one of the plurality of mutable fields and not any of the at least one immutable field.

In one form, each of the plurality of data sub-records may include only one of the primary information or the plurality of data values such that a first sub-record comprising at least one of the plurality of data values is obtained and updated without a second sub-record that comprises a part of the primary information.

In one or more example embodiments, the method 500 may further involve obtaining a request to fetch the complex data record, selecting one or more of the plurality of data sub-records based on the request, generating a new record that models the complex data record by combining one or more of selected data sub-records, and providing the new record to a user device for performing one or more actions.

In one form, the request may be an updating request. The new record may include a first set of sub-records having at least one of the plurality of data values and not a second set of sub-records having the primary information.

In another form, the new record may include the plurality of data sub-records based on the request being for an entirety of the complex data record.

In one or more example embodiments, the operation 504 of generating the plurality of data sub-records may involve generating a first sub-record having at least one of a rate identifier and a transport mode for a freight management system and generating a second sub-record having at least one time-related data value or at least one price-related data value that are negotiated and approved using a smart contract.

Figure 6:
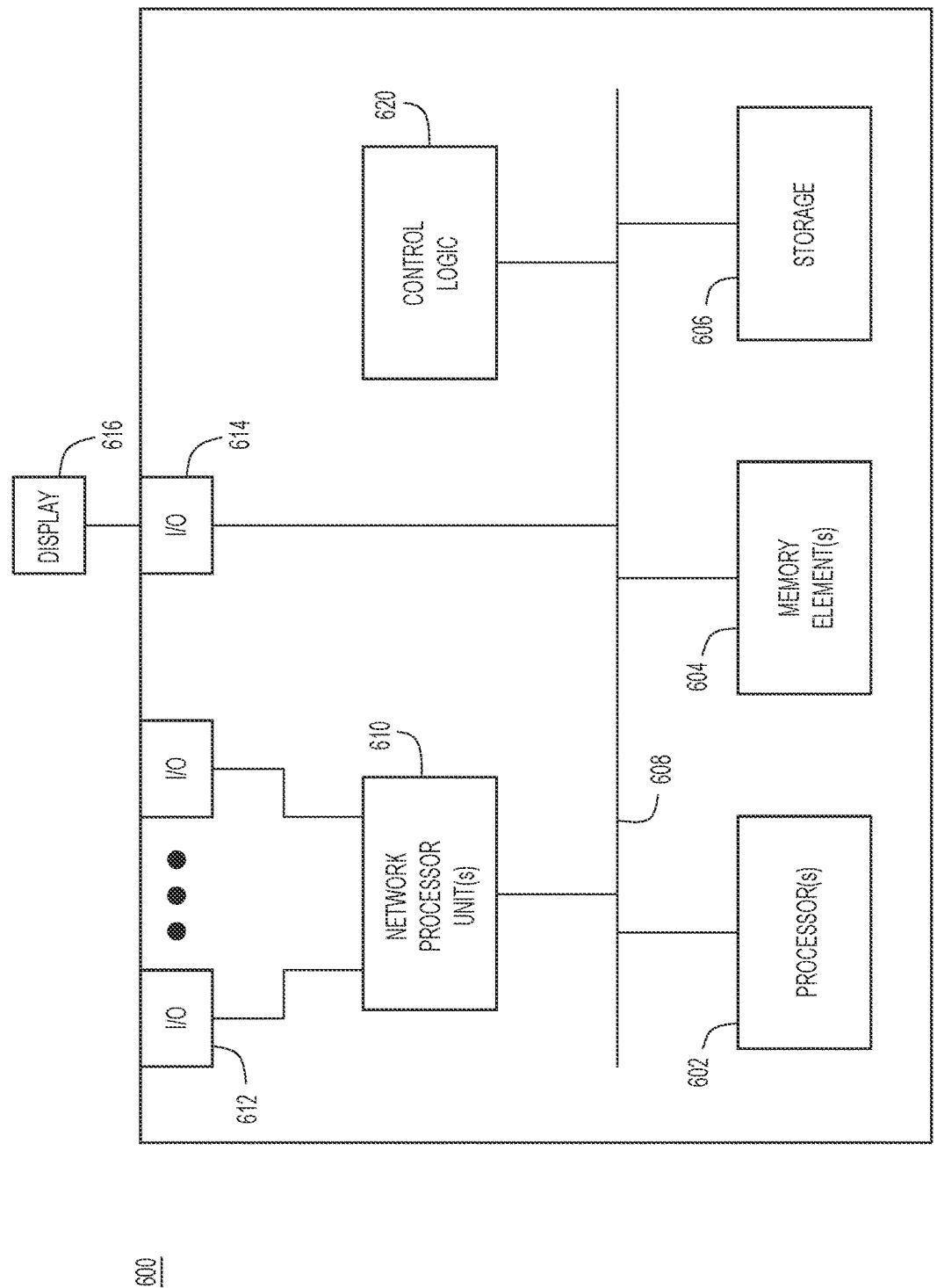
FIG. 6 is a hardware block diagram of a computing device that may perform functions associated with any combination of operations in connection with the techniques depicted and described in FIGS. 1-5, according to various example embodiments.

FIG. 6 is a hardware block diagram of a computing device 600 that may perform functions associated with any combination of operations in connection with the techniques depicted in FIGS. 1-5, according to various example embodiments, including, but not limited to, operations of one of user devices of the entities 110*a-n*, the record management engine 120, the blockchain network 130, the record splitting engine 210 of FIG. 2, the record combining engine 310 of FIG. 3, or the REDIS 220 of FIGS. 2 and 3. It should be appreciated that FIG. 6 provides only an illustration of one example embodiment and does not imply any limitations with regard to the environments in which different example embodiments may be implemented. Many modifications to the depicted environment may be made.

In at least one embodiment, computing device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with one or more memory elements 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, and/or any other I/O port(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computing device 600. For example, I/O interface(s) 614 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor 616, a display screen (touch screen on a mobile device), or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In another example embodiment, an apparatus is provided. The apparatus includes a network interface to receive and send packets in a network and a processor. The processor is configured to perform various operations including obtaining a complex data record that includes at least one unique identifier, primary information about the complex data record, and a plurality of data values that change over time and generating a plurality of data sub-records. The plurality of data sub-records are generated by splitting, based on a set of rules, the complex data record into a plurality of parts in which at least a portion of the primary information is separated from the plurality of data values and added to a respective data sub-record of the plurality of data sub-records, generating a unique binding identifier, and adding the unique binding identifier to each of the plurality of data sub-records to link the plurality of data sub-records to each other. The operations further include storing, using an in-memory database, the plurality of data sub-records into a blockchain.

In yet another example embodiment, one or more non-transitory computer readable storage media encoded with instructions are provided. When the media is executed by a processor, the instructions cause the processor to execute a method that involves obtaining a complex data record that includes at least one unique identifier, primary information about the complex data record and a plurality of data values that change over time and generating a plurality of data sub-records. The plurality of data sub-records are generated by splitting, based on a set of rules, the complex data record into a plurality of parts in which at least a portion of the primary information is separated from the plurality of data values and added to a respective data sub-record of the plurality of data sub-records, generating a unique binding identifier, and adding the unique binding identifier to each of the plurality of data sub-records to link the plurality of data sub-records to each other. The method further includes storing, using an in-memory database, the plurality of data sub-records into a blockchain.

In yet another example embodiment, a system is provided that includes the devices and operations explained above with reference to FIGS. 1-6.

The programs described herein (e.g., control logic 620) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 606 and/or memory elements(s) 604 can store data, software, code, instructions (e.g., processor instructions), logic, parameters, combinations thereof, and/or the like used for operations described herein. This includes the storage 606 and/or memory elements(s) 604 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data, or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   obtaining a complex data record that includes at least one unique identifier, primary information about the complex data record, and a plurality of data values that change over time;
   generating a plurality of data sub-records by:
   splitting, based on a set of rules, the complex data record into a plurality of parts in which at least a portion of the primary information is separated from the plurality of data values and added to a respective data sub-record of the plurality of data sub-records, generating a unique binding identifier, and
adding the unique binding identifier to each of the plurality of data sub-records to link the plurality of data sub-records to each other; and
storing, using an in-memory database, the plurality of data sub-records into a blockchain,
wherein the complex data record is a rate record comprising a rate-record identifier, and the plurality of data values are classified into one of a first field in which a first set of values are used to generate event transactions or a second field in which a second set of values are not yet approved and are not used in generating the event transactions.

2. The method of claim 1, wherein the plurality of data sub-records are a same size, and wherein storing the plurality of data sub-records into the blockchain includes:
converting the plurality of data sub-records into a key-value format; and
uploading, using an application programming interface, in parallel, the plurality of data sub-records, in the key-value format, into the blockchain.

3. The method of claim 1, wherein generating the plurality of data sub-records includes:
converting the complex data record into a plain object that includes the primary information and the plurality of data values being renamed with respect to a plurality of field names in the complex data record.

4. The method of claim 3, wherein splitting the complex data record includes:
obtaining, from the plain object, the primary information and the at least one unique identifier that does not change over time;
generating at least one immutable field; and
adding the primary information, obtained from the plain object, to the at least one immutable field.

5. The method of claim 4, wherein splitting the complex data record further includes:
obtaining, from the plain object, the plurality of data values that include at least one negotiable data value and at least one approved data value;
generating a plurality of mutable fields; and
adding the plurality of data values into the plurality of mutable fields.

6. The method of claim 5, wherein generating the plurality of data sub-records includes:
generating a first sub-record that includes the at least one immutable field and not any of the plurality of mutable fields; and
generating a second sub-record that includes at least one of the plurality of mutable fields and not any of the at least one immutable field.

7. The method of claim 1, wherein each of the plurality of data sub-records includes only one of the primary information or the plurality of data values such that a first sub-record comprising at least one of the plurality of data values is obtained and updated without a second sub-record that comprises a part of the primary information.

8. The method of claim 1, further comprising:
obtaining a request to fetch the complex data record;
selecting one or more of the plurality of data sub-records based on the request;
generating a new record that models the complex data record by combining one or more of selected data sub-records; and
providing the new record to a user device for performing one or more actions.

9. The method of claim 8, wherein the request is an updating request and wherein the new record includes a first set of sub-records having at least one of the plurality of data values and not a second set of sub-records having the primary information.

10. The method of claim 8, wherein the new record includes the plurality of data sub-records based on the request being for an entirety of the complex data record.

11. The method of claim 1, wherein generating the plurality of data sub-records includes:
generating a first sub-record having at least one a transport mode for a freight management system; and
generating a second sub-record having at least one time-related data value or at least one price-related data value that are negotiated and approved using a smart contract.

12. The method of claim 1, wherein the plurality of data sub-records include a plurality of rate card blocks comprising a first rate card block set that stores immutable information including the primary information and at least one second rate card block set that stores mutable information including the plurality of data values, which include numeric values subject to negotiation and approval and that change over time.

13. The method of claim 1, further comprising:
processing one or more fields in the complex data record based on a renaming schema.

14. An apparatus comprising:
a network interface to receive and send packets in a network; and
a processor, wherein the processor is configured to perform operations comprising:
obtaining a complex data record that includes at least one unique identifier, primary information about the complex data record, and a plurality of data values that change over time;
generating a plurality of data sub-records by:
splitting, based on a set of rules, the complex data record into a plurality of parts in which at least a portion of the primary information is separated from the plurality of data values and added to a respective data sub-record of the plurality of data sub-records,
generating a unique binding identifier, and
adding the unique binding identifier to each of the plurality of data sub-records to link the plurality of data sub-records to each other; and
storing, using an in-memory database, the plurality of data sub-records into a blockchain,
wherein the complex data record is a rate record comprising a rate-record identifier, and the plurality of data values are classified into one of a first field in which a first set of values are used to generate event transactions or a second field in which a second set of values are not yet approved and are not used in generating the event transactions.

15. The apparatus of claim 14, wherein the plurality of data sub-records are a same size, and wherein the processor is configured to store the plurality of data sub-records into the blockchain by:
converting the plurality of data sub-records into a key-value format; and
uploading, using an application programming interface, in parallel, the plurality of data sub-records, in the key-value format, into the blockchain.

16. The apparatus of claim 14, wherein the processor is configured to generate the plurality of data sub-records by:
  converting the complex data record into a plain object that includes the primary information and the plurality of data values being renamed with respect to a plurality of field names in the complex data record.

17. The apparatus of claim 16, wherein the processor is configured to split the complex data record by:
  obtaining, from the plain object, the primary information and the at least one unique identifier that does not change over time;
  generating at least one immutable field; and
  adding the primary information, obtained from the plain object, to the at least one immutable field.

18. The apparatus of claim 17, wherein the processor is configured to split the complex data record further by:
  obtaining, from the plain object, the plurality of data values that include at least one negotiable data value and at least one approved data value;
  generating a plurality of mutable fields; and
  adding the plurality of data values into the plurality of mutable fields.

19. One or more non-transitory computer readable storage media encoded with software comprising computer executable instructions that, when executed by a processor, cause the processor to perform a method including:
  obtaining a complex data record that includes at least one unique identifier, primary information about the complex data record and a plurality of data values that change over time;
  generating a plurality of data sub-records by:
    splitting, based on a set of rules, the complex data record into a plurality of parts in which at least a portion of the primary information is separated from the plurality of data values and added to a respective data sub-record of the plurality of data sub-records, generating a unique binding identifier, and
    adding the unique binding identifier to each of the plurality of data sub-records to link the plurality of data sub-records to each other; and
  storing, using an in-memory database, the plurality of data sub-records into a blockchain,
  wherein the complex data record is a rate record comprising a rate-record identifier, and the plurality of data values are classified into one of an first field in which a first set of values are used to generate event transactions or a second field in which a second set of values are not yet approved and are not used in generating the event transactions.

20. The one or more non-transitory computer readable storage media according to claim 19, wherein the plurality of data sub-records are a same size, and wherein the computer executable instructions cause the processor to store the plurality of data sub-records into the blockchain by:
  converting the plurality of data sub-records into a key-value format; and
  uploading, using an application programming interface, in parallel, the plurality of data sub-records, in the key-value format, into the blockchain.

* * * * *